(12) United States Patent
Hakla et al.

(10) Patent No.: US 10,906,646 B2
(45) Date of Patent: Feb. 2, 2021

(54) INTEGRATED PASSENGER SERVICE UNIT (PSU)

(71) Applicant: B/E Aerospace, Inc., Winston-Salem, NC (US)

(72) Inventors: Haytham Hakla, Winston-Salem, NC (US); Alexander Pozzi, Winston-Salem, NC (US)

(73) Assignee: B/E Aerospace, Inc., Winston Salem, NC (US)

( * ) Notice: Subject to any disclaimer, the term of this patent is extended or adjusted under 35 U.S.C. 154(b) by 128 days.

(21) Appl. No.: 16/363,710

(22) Filed: Mar. 25, 2019

(65) Prior Publication Data

US 2019/0344891 A1 Nov. 14, 2019

Related U.S. Application Data

(63) Continuation-in-part of application No. 15/977,753, filed on May 11, 2018.

(51) Int. Cl.
*B64D 11/00* (2006.01)
*B64D 47/00* (2006.01)
*B64D 47/02* (2006.01)

(52) U.S. Cl.
CPC .............. *B64D 11/00* (2013.01); *B64D 47/00* (2013.01); *B64D 47/02* (2013.01); *B64D 2011/0053* (2013.01)

(58) Field of Classification Search
CPC . B64D 2011/0053; B64D 47/00; B64D 47/02
See application file for complete search history.

(56) References Cited

U.S. PATENT DOCUMENTS 7,880,131 B2  2/2011  Andre et al.
7,884,315 B2  2/2011  Andre et al.
(Continued)

FOREIGN PATENT DOCUMENTS

| EP | 2832643 A1 | 2/2015 |
| EP | 3299293 A1 | 3/2018 |
| WO | 2005079309 A2 | 9/2005 |

OTHER PUBLICATIONS

Extended Search Report dated Oct. 1, 2019 for EP Application No. 19173737.8.

*Primary Examiner* — Jessica B Wong
(74) *Attorney, Agent, or Firm* — Suiter Swantz pc llo

(57) ABSTRACT

An integrated passenger service unit (PSU) is disclosed. The integrated PSU includes a housing installable into an aircraft overhead panel and a control knob set into, and positionable relative to, the housing. The housing incorporates signage elements (e.g., fasten seat belts, no smoking) visible through its exterior surface, as well as reading lights and gasper outlets set thereinto (e.g., as adjacent segments of an annulus). Each reading light includes an LED array selectably configured to illuminate the corresponding seat, and each gasper outlet directs an airstream toward the seat. The housing includes a notification ring configured to illuminate when the passenger calls a flight attendant. A control knob is set within the housing and positionable relative thereto. The control knob incorporates an LCD display and user interface (UI) which allows the occupant or passenger to view and adjust the status of the reading lights, gasper outlets, and notification ring.

20 Claims, 7 Drawing Sheets

(56) References Cited

U.S. PATENT DOCUMENTS

| | | |
|---|---|---|
| 8,729,457 B2 | 5/2014 | Andre et al. |
| 8,735,800 B2 | 5/2014 | Andre et al. |
| 9,377,821 B2 | 6/2016 | Andre et al. |
| 9,423,835 B2 | 8/2016 | Andre et al. |
| 9,487,296 B2 | 11/2016 | Freund et al. |
| 10,034,349 B2 | 7/2018 | Andre et al. |
| 10,034,350 B2 | 7/2018 | Andre et al. |
| 2009/0108649 A1* | 4/2009 | Kneller ............... B64D 11/00 297/217.6 |
| 2012/0230530 A1 | 9/2012 | Schevardo |
| 2014/0186026 A1 | 7/2014 | Oshima et al. |
| 2014/0329452 A1* | 11/2014 | Wirth ............... B64D 11/00 454/152 |
| 2017/0203856 A1 | 7/2017 | Dunn et al. |
| 2018/0136733 A1 | 5/2018 | Schalla et al. |
| 2018/0324927 A1 | 11/2018 | Andre et al. |
| 2018/0324928 A1 | 11/2018 | Andre et al. |
| 2019/0329889 A1 | 10/2019 | Afonso et al. |
| 2019/0344892 A1* | 11/2019 | Pozzi ............... B64D 11/00 |

\* cited by examiner

US 10,906,646 B2

INTEGRATED PASSENGER SERVICE UNIT (PSU)

CROSS-REFERENCE TO RELATED APPLICATIONS

The present application is related to and claims the benefit of the earliest available effective filing date under 35 USC § 120 as a continuation in part of U.S. patent application Ser. No. 15/977,753 entitled UNIFIED PASSENGER SERVICE UNIT (PSU) CONTROL, filed May 11, 2018. Said U.S. patent application Ser. No. 15/977,753 is herein incorporated by reference in its entirety.

BACKGROUND

Conventional passenger service units (PSU) installed in overhead panels generally provide passengers with a reading light, a gasper or fan outlet, and a call button (for requesting assistance from cabin crew) as separate elements, which can create a complicated and cluttered appearance. This is particularly applicable to group PSUs which duplicate these components for a group of adjacent passenger seats. Furthermore, the conventional PSU provides no way for cabin crew to communicate with passengers (apart from announcements broadcast to the cabin as a whole).

SUMMARY

An integrated passenger service unit (PSU) is disclosed. In embodiments, the integrated PSU includes a housing installable into an overhead panel of an aircraft (e.g., over a passenger seat) and a control knob set into the housing. The housing incorporates one or more signage elements (e.g., fasten seat belts, no smoking) featuring backlit layers visible through the exterior surface of the housing. The integrated PSU includes reading lights and gasper outlets set into the housing (e.g., as an annulus). Each reading light includes an array of light emitting diodes (LED) or similar light sources selectably configured to direct a beam toward the passenger seat corresponding to the PSU. Each gasper outlet directs an airstream toward the corresponding passenger seat. The housing includes a notification ring configured to illuminate when the passenger (or occupant of the passenger seat) calls a flight attendant, the notification ring visible by cabin crew in various positions throughout the passenger cabin. The integrated PSU includes a control knob set within the housing and positionable relative to the housing. The control knob incorporates a touch-sensitive LCD display/touch encoder which, via an interactive user interface (UI), allows the occupant or passenger to view and adjust (via the control knob and the LCD touch encoder) the status of the reading lights, gasper outlets, and notification ring.

In embodiments, the notification ring defines an inner circumference or an inner perimeter of the housing (e.g., depending upon the exact shape of the housing).

In embodiments, the control knob is articulable relative to the housing along a horizontal (x) axis, a vertical (y) axis, a rotational axis, or a z-axis.

In embodiments, the integrated PSU is connected to an onboard power supply of the aircraft and draws operating power therefrom.

In embodiments, the integrated PSU is linked to a common area network (CAN) bus or other network bus of the aircraft via a physical data link.

In embodiments, the integrated PSU status displayed by the UI display unit (and adjustable via the control knob) includes an intensity or a direction of the reading light beam.

In embodiments, a passenger or occupant of the passenger seat increases the reading light beam intensity by activating additional light emitting diodes (LED) within the reading light array, and decreases the intensity by deactivating additional LEDs within the array.

In embodiments, the integrated PSU includes a proximity sensor capable of detecting motion (e.g., an approaching hand of the passenger or occupant) proximate to the PSU. In response to detected motion, the display unit (e.g., the UI) activates or the notification ring illuminates.

In embodiments, the integrated PSU includes a proximity timer that, e.g., counts up from the last detected motion. If the proximity timer reaches a threshold, e.g., no motion detected for a preconfigured time window, the integrated PSU enters "sleep mode" and the control knob retracts into the housing. The control knob extends back out of the housing (e.g., and reactivates or reilluminates) in response to subsequent detected motion.

In embodiments, the backlit layers of the signage elements are visible via microholes drilled into the external surface of the housing.

In embodiments, the integrated PSU includes a fan/blower unit situated above the overhead panel but independent of any ducting systems aboard the aircraft; the fan/blower unit generates the airstream emitted by the gasper outlets.

In embodiments, the integrated PSU status includes a speed or a direction of the gasper airstream.

In embodiments, the notification ring activates (e.g., when remotely activated by cabin crew) in concert or in unison with adjacent notification rings of adjacent integrated PSUs.

In embodiments, the notification ring illuminates in a first color or pattern (e.g., blue) when activated by the passenger or occupant and in a second color or pattern (e.g., red or yellow) when remotely activated by cabin crew.

An integrated PSU system is also disclosed. In embodiments, the integrated PSU system includes a group of integrated PSUs installable in a single overhead panel (or in adjacent overhead panels), each integrated PSU corresponding to a particular passenger seat in a group of seats (e.g., a group of two to five adjacent passenger seats). Each integrated PSU includes a housing and a control knob set into the housing. The housing incorporates one or more signage elements (e.g., fasten seat belts, no smoking) featuring backlit layers visible through the exterior surface of the housing. Reading lights and gasper outlets are set into the housing (e.g., as adjacent segments of an annulus). Each reading light includes an array of light emitting diodes (LED) or similar light sources selectably configured to direct a beam toward the corresponding passenger seat, and each gasper outlet directs an airstream toward the corresponding passenger seat. The housing includes a notification ring configured to illuminate when the passenger (or occupant of the passenger seat) calls a flight attendant, the notification ring visible by cabin crew in various positions throughout the passenger cabin. The integrated PSU includes a control knob set within the housing and positionable relative to the housing, e.g., via rotation or via articulation through the x-, y-, or z-axes. The control knob incorporates a touch-sensitive LCD display/touch encoder which, via an interactive user interface (UI), allows the occupant or passenger to view and adjust (via the control knob and the touch encoder) the status of the reading lights, gasper outlets, and notification ring. The notification rings may be individually or collectively activated remotely by cabin crewmembers.

In embodiments, each integrated PSU includes a proximity sensor capable of detecting motion (e.g., an approaching hand of the passenger or occupant) proximate to the PSU. In response to detected motion, the display unit (e.g., the UI) activates or the notification ring illuminates.

In embodiments, each integrated PSU includes a proximity timer that, e.g., counts up from the last detected motion. If the proximity timer reaches a threshold, e.g., no motion detected for a preconfigured time window, the integrated PSU enters "sleep mode" and the control knob retracts into the housing. The control knob extends back out of the housing (e.g., and reactivates or reilluminates) in response to subsequent detected motion.

In embodiments, the group of integrated PSUs can be collectively activated by a cabin crewmember located remotely from the group of passenger seats.

In embodiments, each individual integrated PSU includes (e.g., is connected to) a fan/blower unit situated within the overhead panel and independent of aircraft ducting systems; the airstreams emitted by each gasper outlet are generated by the respective fan/blower unit.

In embodiments, the integrated PSU status displayed by the UI display unit (and adjustable via the control knob) includes an intensity of the reading light beam, a direction of the reading light beam, a speed of the gasper airstream, or a direction of the gasper airstream.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
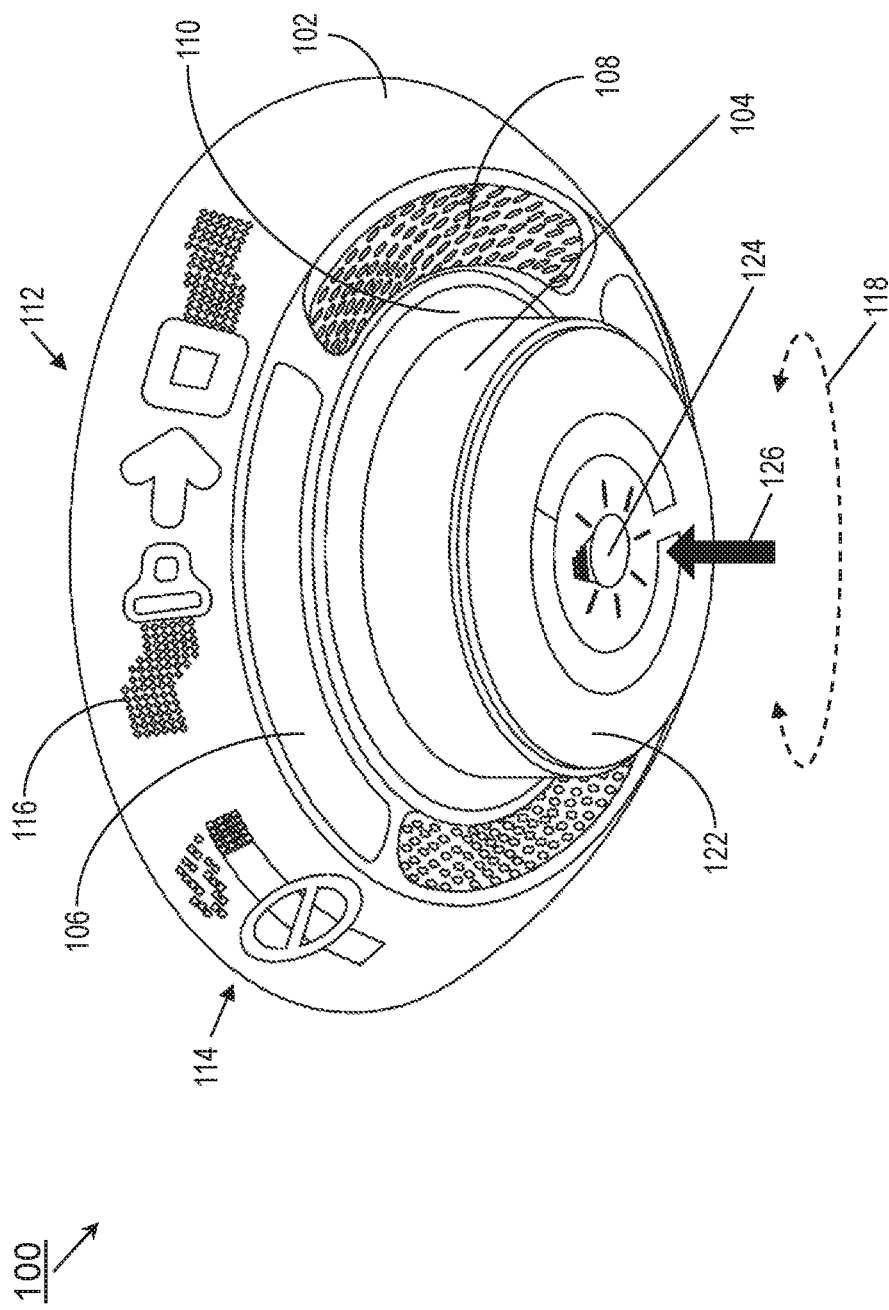
FIG. 1 is an illustration of an integrated passenger service unit (PSU), in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

An integrated passenger service unit (PSU) is disclosed. The integrated PSU combines the various functionalities associated with a PSU—an adjustable air gasper and reading light, a flight attendant call button—into a single, compact, modular unit allowing for precise passenger control of these functionalities via a touch encoder and intuitive user interface (UI). The gasper is independent of aircraft ducting systems, making the integrated PSU easily installable and replaceable. The integrated PSU also incorporates fasten-seat-belt (FSB) and no-smoking signage (NSS) into the unit.

Referring to FIG. 1, an integrated passenger service unit 100 (PSU) is shown. The integrated PSU 100 may include a housing 102 into which a control knob 104 is set. The housing 102 may include one or more reading lights 106, one or more gasper outlets 108, and a notification ring 110 set thereinto. The housing 102 may be set into an overhead panel of an aircraft (e.g., within the passenger cabin) and oriented toward a particular passenger seat. The housing 102 may be of any appropriate shape, including but not limited to a substantially rounded conical section having a substantially circular face; two opposing reading lights 106 and two opposing gasper outlets 108 may comprise an outer ring of the substantially circular face, and the notification ring 110 may comprise an inner ring thereof, defining an inner circumference or inner perimeter of the housing. The housing 102 may include an FSB sign 112 and NSS sign 114 set thereinto; for example, the FSB sign and NSS sign may comprise backlit layers or films visible through arrays of microholes 116 drilled into the exterior surface of the housing. For example, the microholes 116 may be blind holes or through holes partially or fully filled with a transparent sealant (such that the microholes 116 may be invisible when the FSB sign 112 and NSS sign 114 are not activated).

The reading lights 106, gasper outlets 108, and notification ring 110 may be activated and controlled by the occupant or passenger via the control knob 104. For example, should the passenger call a flight attendant via the control knob 104, the notification ring 110 may be activated. The notification ring 110 may be oriented (e.g., relative to the housing 102) so as to be visible by cabin crewmembers throughout the passenger cabin, particularly from direct-view positions within the cabin or other locations where cabin crewmembers are likely to be in either a standing or seated position while the aircraft is cruising. Similarly, the notification ring 110 may be remotely activated or deactivated by cabin crewmembers. For example, a lit notification ring 110 may be remotely deactivated by a crewmember to signal the calling passenger that a flight attendant response is imminent, or remotely activated as described below.

The control knob 104 may be set into the housing 102 within the inner perimeter defined by the notification ring 110. The control knob 104 may be generally cylindrical as shown by FIG. 1 or of any other appropriate shape, e.g., square, rounded square/rectangular, triangular, oval, polygonal. The control knob 104 may be positionable (e.g., by the occupant of the passenger seat toward which the integrated PSU 100 is oriented) relative to the housing 102 in a variety of orientations. For example, the control knob 104 may be rotated (118) relative to the housing 102. In some embodiments, the control knob 104 may be actuated in horizontal (x-axis), vertical (y-axis), or z-axis directions.

The face 122 of the control knob 104 may be oriented substantially toward the passenger seat and visible therefrom. The face 122 may be circular in shape (for example, if the control knob 104 is cylindrical in shape). In embodiments, the face 122 may be of any other appropriate shape (e.g., square, rectangular, rounded rectangular, oval, polygonal) depending upon the shape of the control knob 104. The face 122 may substantially comprise a touch-sensitive liquid crystal display (LCD) touch encoder 124. The LCD touch encoder 124 may incorporate a customizable user interface (UI) allowing the passenger to selectably activate or control the reading lights 106, gasper outlets 108, or notification ring 110. For example, the user may submit control input by applying pressure 126 to the LCD touch encoder 124 (or to a particular area thereof), or by rotating (118) the control knob 104. In this way, the user may select a component (e.g., the reading lights 106, the gasper outlets 108, the notification ring 110) to activate, deactivate, or adjust.

Figure 2:
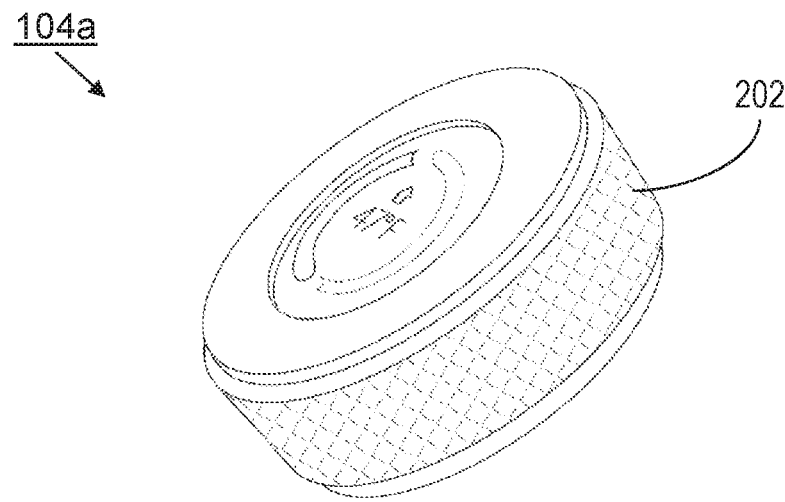
FIG. 2 is an isometric view of a control knob of the integrated PSU of FIG. 1.

Referring now to FIG. 2, the control knob 104a may be implemented and may function similarly to the control knob 104 of FIG. 1, except that the control knob 104a may include texturing (202) around the outer surface of the control knob to facilitate grip and rotation of the control knob by the passenger or occupant. In embodiments, the surface of the control knob 104a may be a straight cylindrical surface as shown by FIG. 2, or the surface may taper inward or outward from the housing (102, FIG. 1).

Figure 3:
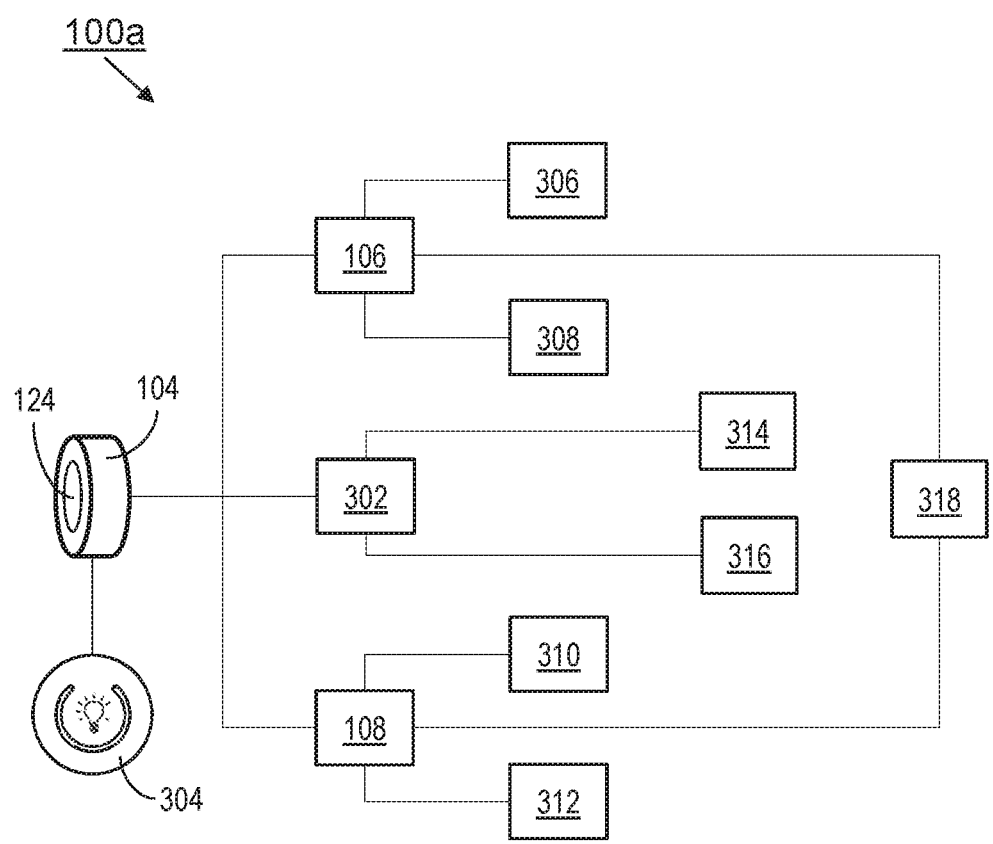
FIG. 3 is a block diagram illustrating control operations of the integrated PSU of FIG. 1.

Referring now to FIG. 3, the integrated PSU 100a may be implemented and may function similarly to the integrated PSU 100 of FIG. 1, except that the integrated PSU 100a may allow the passenger or occupant of the corresponding passenger seat (e.g., to which the integrated PSU is oriented) to control the reading lights 106, control the gasper outlets 108, or call a flight attendant (302) via the control knob 104 and the LCD touch encoder 124, with feedback displayed to the passenger via the UI 304. The integrated PSU 100a may be easily installable or replaceable in its overhead panel by minimizing the necessary physical connections or integrations into ducting or wiring systems of the aircraft.

For example, the passenger may select (via the control knob 104) either the reading light 106 or the gasper outlet 108, and increase or decrease the intensity (306) and adjust the direction (308) of the reading light 106 via the control knob 104. Similarly, the passenger may increase or decrease the speed (310) or adjust the direction (312) of the airstream provided by the gasper outlets 108. In embodiments, the integrated PSU 100a is linked to onboard controller networks and devices via a physical data link to a controller area network (CAN) bus 314, via which the flight attendant call may be received or the notification ring (110, FIG. 1) remotely activated by cabin crew. In embodiments, the integrated PSU 100a is partially or fully in communication with aircraft networks and devices via wireless link 316. In embodiments, the integrated PSU 100a may draw power for the reading light 106 or gasper outlets 108 via physical link to an onboard power supply (318).

Figure 4A:
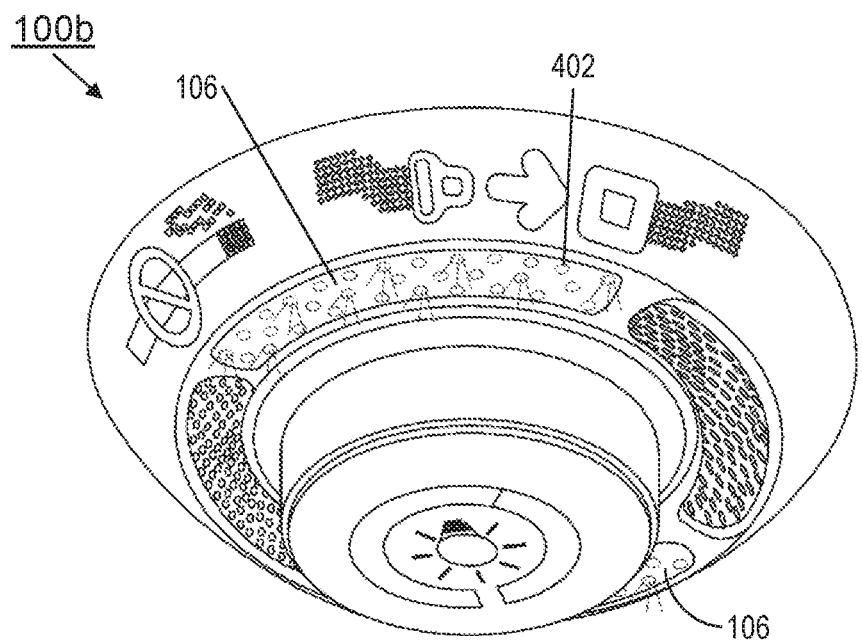
FIGS. 4A and 4B are illustrations of reading light and gasper operations of the integrated PSU of FIG. 1.
Figure 4B:
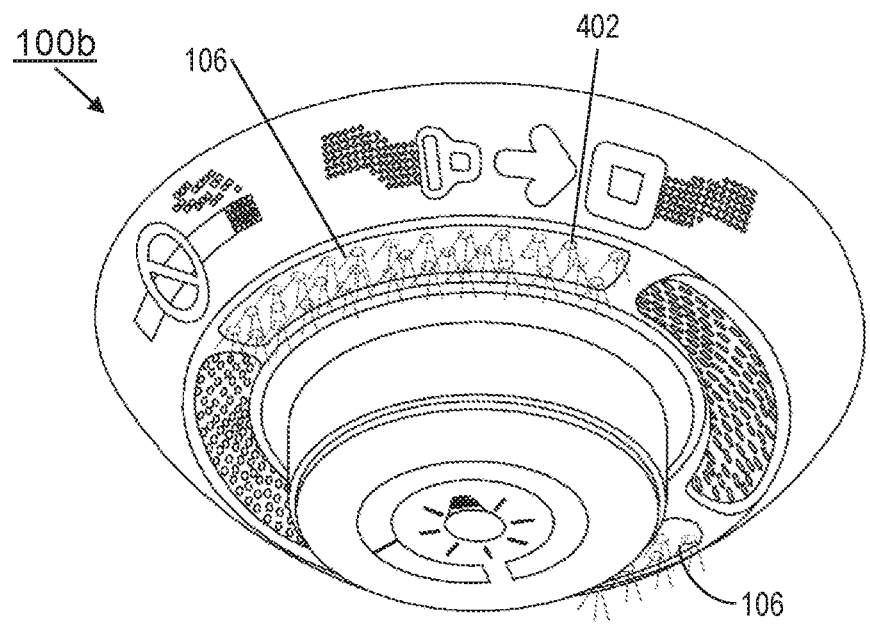

Referring now to FIGS. 4A and 4B, the integrated PSU 100b may be implemented and may function similarly to the integrated PSUs 100, 100a of FIGS. 1 and 3, except that the integrated PSU 100b may regulate the intensity of the reading lights 106 via activation and deactivation of individual light emitting diodes 402 (LED) therewithin. For example, each reading light 106 may comprise an array of individual LEDs 402 configured to serially activate or deactivate, such that the reading light 106 has a number of discrete intensity settings corresponding to the number of LEDs 402. In embodiments, one or more individual LEDs 402 may be dimmable, such that the reading light 106 is capable of a continuum of intensity levels between its maximum and minimum brightness. Referring in particular to FIG. 3A, a lower intensity setting of the reading light 106 may be achieved by activating a smaller portion of the LEDs 402, e.g., 20 to 30 percent. Referring in particular to 3B, a maximum intensity setting of the reading light 106 may be achieved by activating every individual LED 402 within the reading light 106.

Figure 4C:
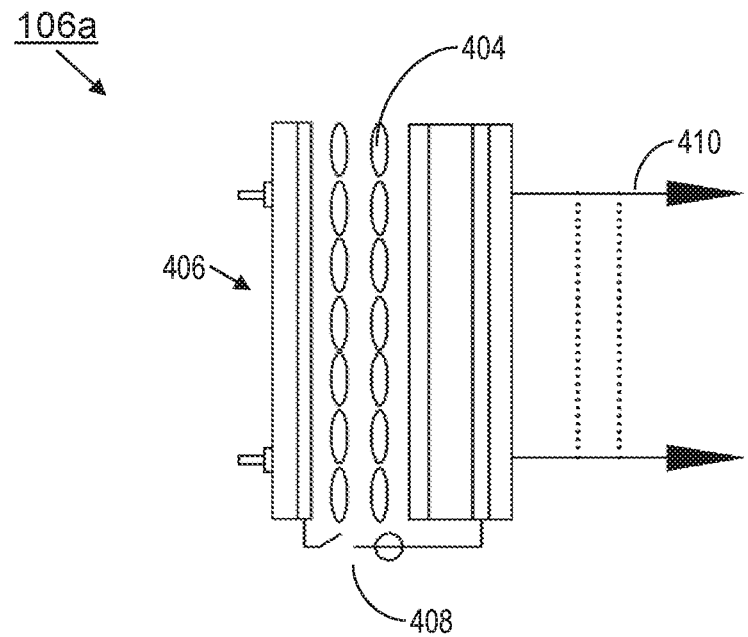
FIGS. 4C and 4D are diagrammatic cross-sectional illustrations of the reading light of the integrated PSU of FIG. 1.
Figure 4D:
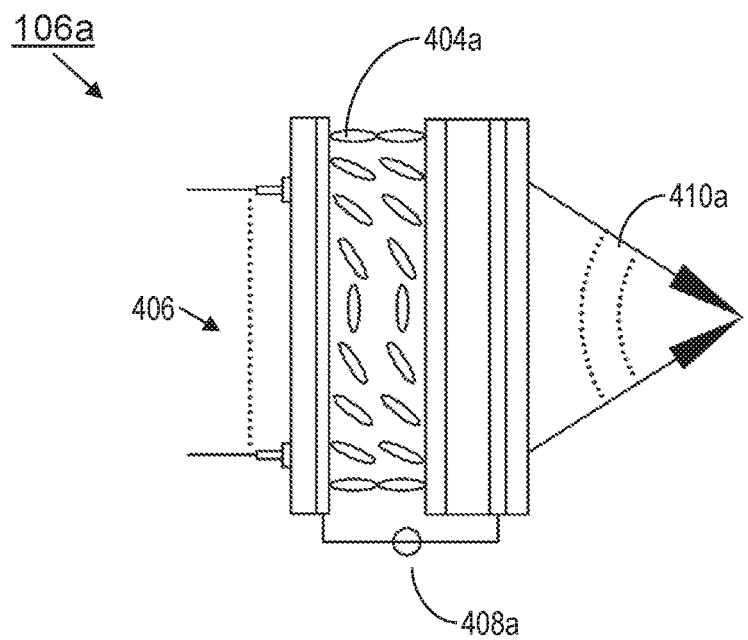

Referring to FIGS. 4C and 4D, the reading light 106a may be implemented and may function similarly to the reading light 106 of FIGS. 4A and 4B, except that the reading light 106a may incorporate dynamic beam shaping lenses 404 to regulate the focus, or spotlight size, of the output of the LED array 406 (e.g., the array of individual LEDs 402 as shown by FIGS. 4A and 4B). For example, referring in particular to FIG. 4A, if no focusing signal (408) is applied to the LED array 406, the output of the reading light 106 may be a uniform beam 410 that neither converges nor diverges.

Referring in particular to FIG. 4D, in some embodiments the passenger may apply (via the control knob (104, FIG. 3B) and UI (304, FIG. 3B) a focusing signal (408a; e.g., based on control input submitted via the control knob (104, FIG. 1)) or the touch-sensitive LCD touch encoder (124, FIG. 1) such that the dynamic beam shaping lenses are aligned (404a) to focus the output of the LED array 406. In this way, the beam output of the reading light 106a may be controlled by the passenger to converge (410a) or diverge.

Figure 5A:
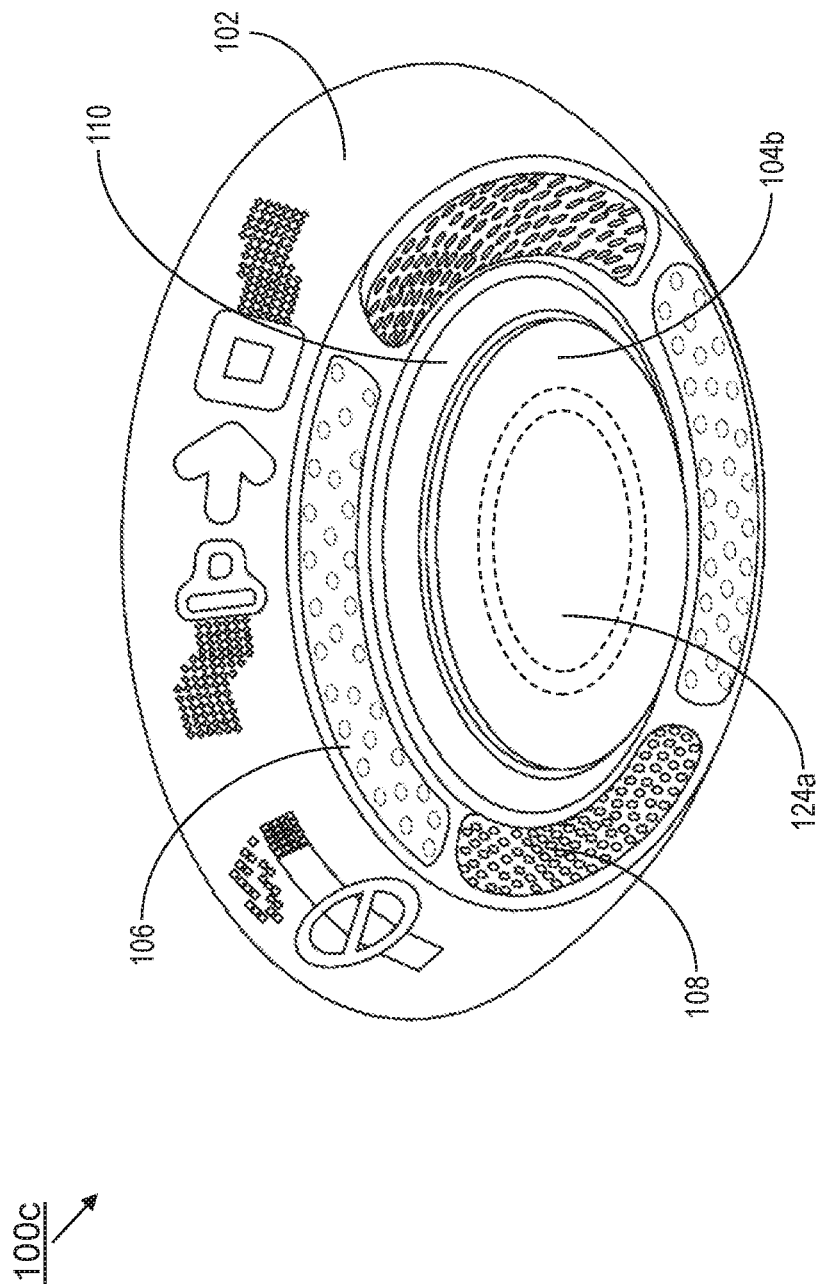
FIG. 5A is an illustration of the integrated PSU of FIG. 1 in a retracted state.
Figure 5B:
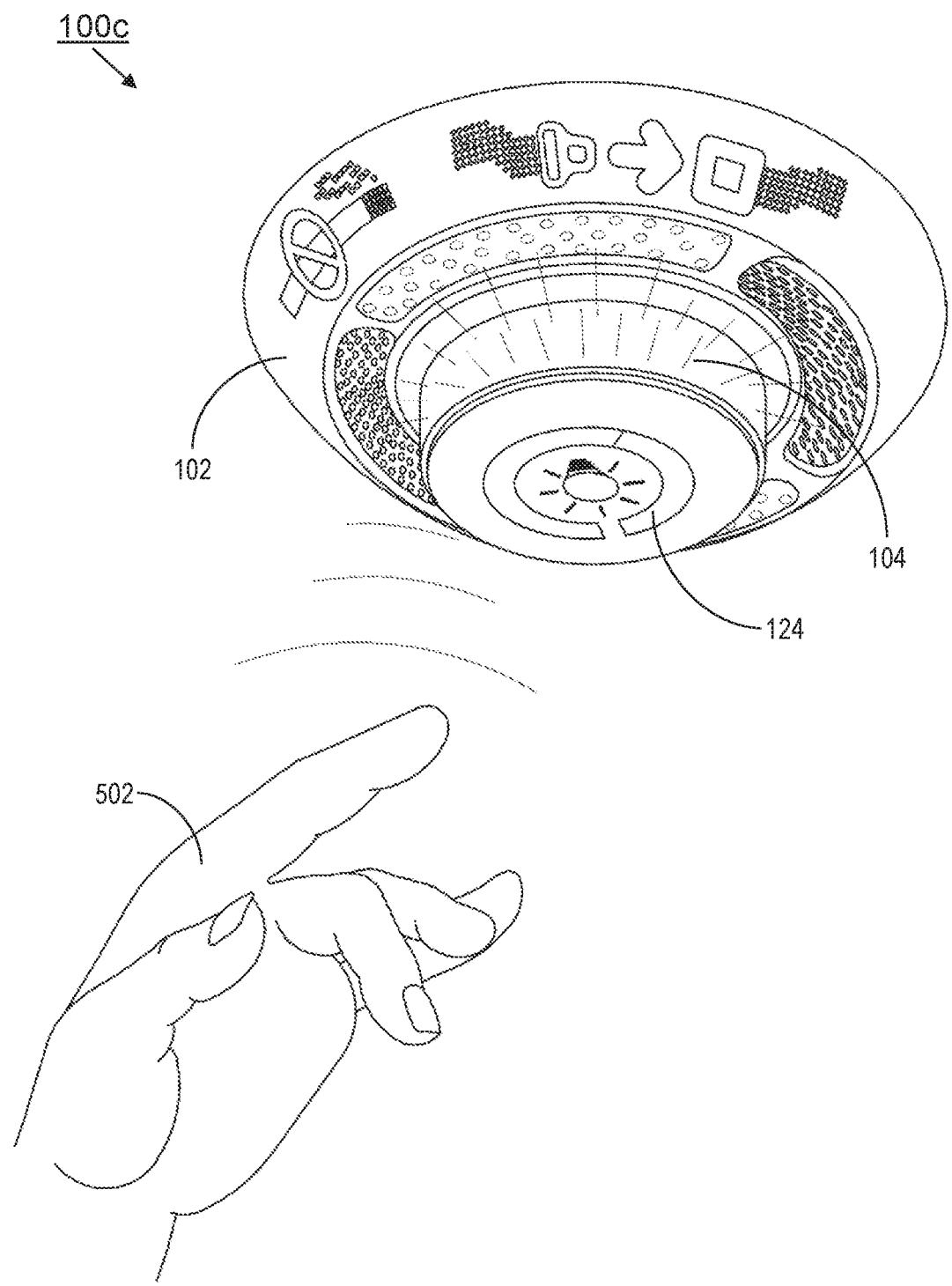
FIG. 5B is an illustration of the integrated PSU of FIG. 5A in an extended state.

Referring now to FIGS. 5A and 5B, the integrated PSU 100c may be implemented and may function similarly to the integrated PSUs 100, 100a-b of FIGS. 1, 3, and 4A/B, except that the integrated PSU 100c may incorporate a proximity sensor to detect motion within a preconfigured radius (e.g., a hand 502 of the passenger) and may be capable of active and inactive (e.g., "sleep") modes; the inactive or sleep mode may commence if no motion or activity is detected for a preconfigured amount of time.

For example, referring in particular to FIG. 5A, the integrated PSU 100c may incorporate a proximity timer that activates after the proximity sensor detects motion within a radius of the integrated PSU. In embodiments, the proximity timer may be embodied in a processor of the PSU; alternatively, the proximity timer may be controlled by an onboard controller device or network linked to the integrated PSU 100c via physical or wireless data link. If the proximity timer expires (e.g., after 1 minute) and no further motion has been detected, the control knob may retract (104b) into the housing 102. In embodiments, the UI of the LCD touch encoder may temporarily deactivate (124a) when the control knob 104b retracts, although any configured settings (e.g., of the reading lights 106, the gasper outlets 108, or the notification ring 110) may be preserved.

Referring in particular to FIG. 5B, if the integrated PSU 100c, when in the "sleep" state, detects the hand 502 of the passenger (or any other motion proximate to the integrated PSU), the integrated PSU may resume active mode. For example, the control knob 104 may extend out from the housing 102, and the LCD touch encoder 124 may reactivate.

Figure 6:
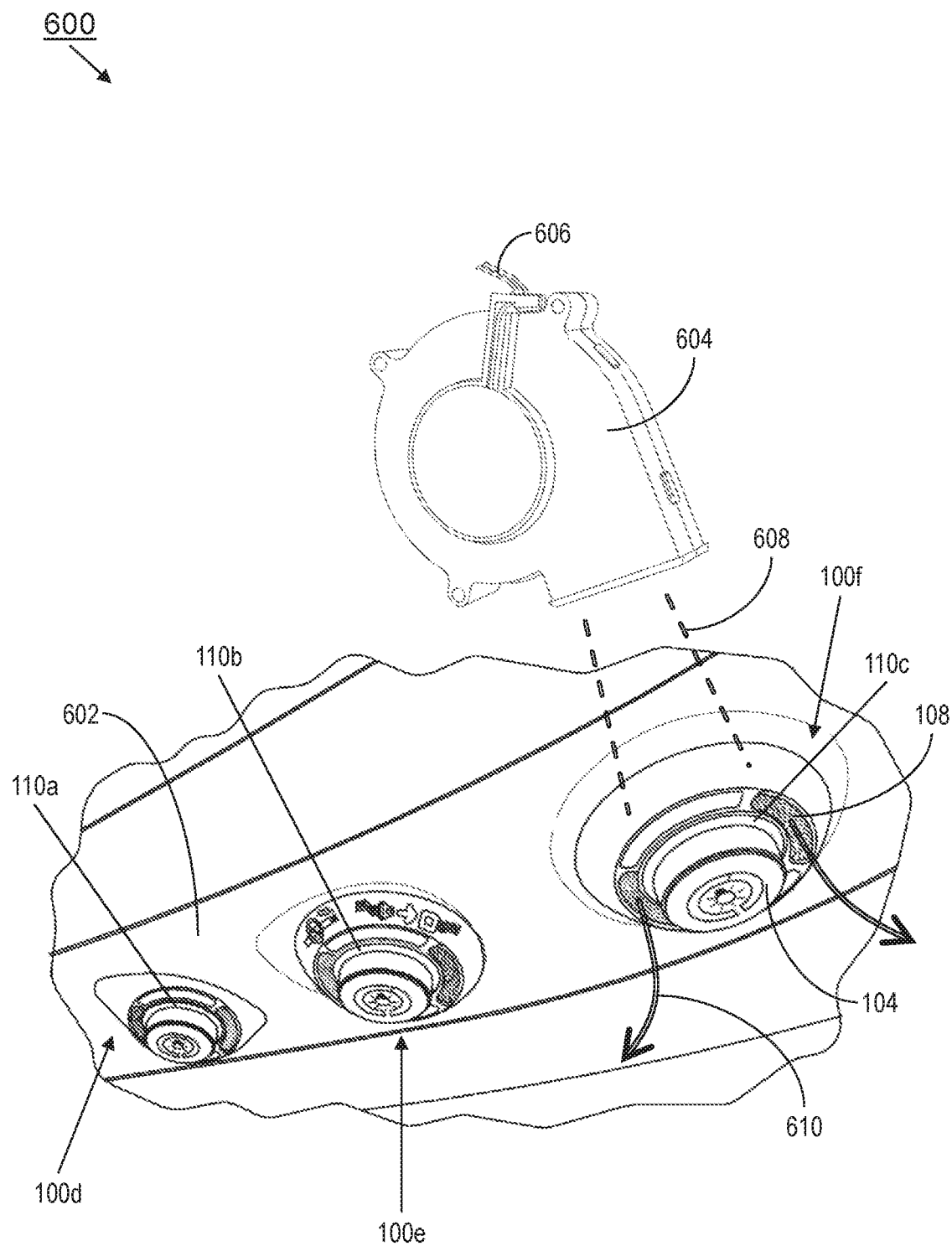
FIG. 6 is an illustration of an integrated PSU system, in accordance with example embodiments of this disclosure.

Referring now to FIG. 6, the integrated PSUs 100d-f may be implemented similarly to the integrated PSUs 100, 100a-c of FIGS. 1, 3, 4A/B, and 5A/B, except that the integrated PSUs 100d-f may comprise an integrated PSU system 600 of two, three, or more individual units set into a single overhead panel 602, each integrated PSU 100d-f corresponding to, and oriented toward, a particular passenger seat within a group (e.g., a group of adjacent passenger seats generally including between two and five seats). For example, the notification rings 110a-c of the respective integrated PSUs 100d-f may be activated remotely by cabin crewmembers (e.g., in unison or in concert with each other) in a given color to indicate that the passengers occupying the corresponding seats may deplane, or should remain seated. For example, a single notification ring 110c may illuminate in blue when activated by the passenger (e.g., when calling a flight attendant) while the group of notification rings 110a-c may collectively illuminate in yellow when remotely activated by cabin crew.

The gasper outlets 108 of each integrated PSU 100d-f may be fed by a self-contained local fan/blower unit 604 disposed above the overhead panel 602. The fan/blower unit 604 may operate independent of aircraft ducting systems, requiring only a power connection 606 to an onboard power supply (318, FIG. 3) to feed the speed-controlled (310, FIG. 3) fan/blower. The airstream 608 generated by the fan/blower unit 604 may be redirected (610) by actuated blades within the gasper outlet 108 based on control input provided by the passenger via the control knob 104.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. An integrated passenger service unit (PSU), comprising:
   a housing capable of installation into an overhead panel of an aircraft, the housing associated with a passenger seat of the aircraft and having an exterior surface;
   one or more signage elements disposed within the housing, each signage element including a backlit layer visible through the external surface;
   at least one reading light set into the housing, the reading light comprising an array of one or more light emitting diodes (LED) configured to emit a beam toward the passenger seat;
   at least one gasper outlet set into the housing adjacent to the reading light, the gasper outlet configured to direct an airstream toward the passenger seat;
   a notification ring set into the housing and visible from at least one cabin crew position within the aircraft, the notification ring configured to illuminate upon activation;
   a control knob set within the housing and positionable relative thereto, the control knob having a face oriented toward the passenger seat;
   and
   a touch-sensitive display unit set into the face and configured to display a user interface (UI) associated with at least one status adjustable via one or more of the control knob and the touch-sensitive display unit, the status associated with at least one of the reading light, the gasper outlet, and the notification ring.

2. The integrated PSU of claim 1, wherein the notification ring defines at least one of an inner perimeter and an inner circumference of the housing.

3. The integrated PSU of claim 1, wherein the control knob is articulable relative to one or more of a horizontal axis, a vertical axis, a rotational axis, and a z-axis.

4. The integrated PSU of claim 1, wherein the integrated PSU is operatively coupled to a power supply of the aircraft and configured to receive operating power therefrom.

5. The integrated PSU of claim 1, wherein the integrated PSU is communicatively coupled to at least one network bus of the aircraft via physical data link.

6. The integrated PSU of claim 1, wherein the at least one status corresponds to the reading light and includes at least one of a beam intensity and a beam direction.

7. The integrated PSU of claim 6, wherein the UI is configured to increase the beam intensity by activating at least one LED of the array and decrease the beam intensity by deactivating at least one LED of the array.

8. The integrated PSU of claim 1, further comprising:
at least one proximity sensor communicatively coupled to the UI, the proximity sensor configured to detect motion proximate to the integrated PSU,
and
at least one of the display unit and the notification ring configured to activate in response to the detected motion.

9. The integrated PSU of claim 8, further comprising:
a proximity timer configured to measure an elapsed time from the most recent detected motion;
the control knob further configured to, when the elapsed time reaches a threshold, retract into a dormant position wherein the face of the control knob is substantially flush with the housing;
and
the control knob configured to, in response to a subsequent detected motion, extend from the housing.

10. The integrated PSU of claim 1, wherein the backlit layer of the signage element is visible through a plurality of microholes drilled into the external surface.

11. The integrated PSU of claim 1, further comprising:
at least one blower unit disposed above the overhead panel and independent of an aircraft ducting system, the blower unit operatively coupled to the control knob and configured to generate the airstream.

12. The integrated PSU of claim 11, wherein the at least one status corresponds to the blower unit and includes at least one of an airstream speed and an airstream direction.

13. The integrated PSU of claim 1, wherein the integrated PSU is a first integrated PSU, the notification ring is a first notification ring, the passenger seat is a first passenger seat, and:
the notification ring is configured to activate in unison with at least one second notification ring of a second integrated PSU associated with a second passenger seat.

14. The integrated PSU of claim 1, wherein:
the notification ring is configured for activation according to a first pattern when activated by an occupant of the passenger seat;
and
the notification ring is configured for activation according to at least one second pattern when activated by a crewmember located remotely from the passenger seat.

15. An integrated passenger service unit (PSU) system, comprising:
a plurality of integrated PSUs installable in an overhead panel of an aircraft and associated with a group of two or more passenger seats proximate to the overhead panel, each integrated PSU corresponding to a passenger seat of the group and comprising:
a) a housing having an exterior surface;
b) one or more signage elements disposed within the housing, each signage element including a backlit layer visible through the external surface;
c) at least one reading light set into the housing, each reading light comprising an array of one or more light emitting diodes (LED) collectively configured to emit a beam toward the corresponding passenger seat;
d) at least one gasper outlet set into the housing adjacent to the reading light, the gasper outlet configured to direct an airstream toward the corresponding passenger seat;
e) a notification ring set into the housing and visible from at least one cabin crew position within the aircraft, the notification ring configured to illuminate upon activation;
f) a control knob set within the housing and positionable relative thereto, the control knob having a face substantially oriented toward the corresponding passenger seat;
and
g) a touch-sensitive display unit set into the face and configured to display a user interface (UI) associated with at least one status adjustable via one or more of the control knob and the touch-sensitive display unit, the status associated with at least one of the reading light, the gasper outlet, and the notification ring.

16. The integrated PSU system of claim 15, wherein each integrated PSU further comprises:
at least one proximity sensor communicatively coupled to the UI, the proximity sensor configured to detect motion proximate to the integrated PSU,
and
at least one of the display unit and the notification ring configured to activate in response to the detected motion.

17. The integrated PSU system of claim 16, wherein each integrated PSU further comprises:
a proximity timer configured to measure an elapsed time from the most recent detected motion;
the control knob further configured to, when the elapsed time reaches a threshold, retract into a dormant position wherein the face of the control knob is substantially flush with the housing;
and
the control knob configured to, in response to a subsequent detected motion, extend from the housing.

18. The integrated PSU system of claim 15, wherein the plurality of notification rings are configured for collective activation by a crewmember located remotely from the group of passenger seats.

19. The integrated PSU system of claim 15, further comprising:
a plurality of blower units disposed above the overhead panel and independent of an aircraft ducting system, each blower unit operatively coupled to a corresponding integrated PSU via the control knob and configured to generate the airstream.

20. The integrated PSU system of claim 15, wherein the at least one status includes at least one of: an intensity of the beam; a direction of the beam; a speed of the airstream; and a direction of the airstream.

* * * * *